United States Patent [19]
Elsner et al.

[11] 3,733,545
[45] May 15, 1973

[54] METHOD FOR LOCATING NONLINEAR MECHANICAL JUNCTIONS OF METALLIC ELECTRICAL CONDUCTORS

[75] Inventors: Raymond F. Elsner, Lombard; William F. Lancaster, Oak Lawn, both of Ill.

[73] Assignee: The United States of America as represented by the Secretary of the Navy, Washington, D.C.

[22] Filed: Apr. 13, 1972

[21] Appl. No.: 243,728

[52] U.S. Cl. .................................................. 324/52
[51] Int. Cl. ............................................. G01r 31/08
[58] Field of Search ..................... 324/51, 52, 54, 66, 324/67, 72, 158, 34, 34 ST

[56] References Cited

UNITED STATES PATENTS

| | | | |
|---|---|---|---|
| 2,007,772 | 7/1935 | Sams et al. | 324/34 |
| 3,163,817 | 12/1964 | Simpson | 324/52 |
| 3,299,351 | 1/1967 | Williams | 324/52 |
| 3,636,437 | 1/1972 | Soulant et al. | 324/34 ST |
| 3,648,161 | 3/1972 | Soulant | 324/34 ST |

Primary Examiner—Gerard R. Strecker
Attorney—R. S. Sciascia et al.

[57] ABSTRACT

A technique and apparatus for identifying and accurately locating nonlinear mechanical junctions of electrical conductors whereby RF interference generated by nonlinear junctions can be eliminated. A fundamental signal is applied to a suspected junction by means of a current probe held in close proximity thereto. Receiver apparatus senses whether third harmonic signals are generated thereby. If third harmonic signals are generated the suspected junction is identified as being nonlinear and its exact location is then determined by connecting a bypassing conductor between the suspected location of the nonlinearity and ground and measuring the resultant reduced amplitude third harmonic signals. The exact location is determined when the bypassing conductor is moved as close to the suspected nonlinearity as is physically practical while maintaining the reduced amplitude of the third harmonic signal.

3 Claims, 1 Drawing Figure

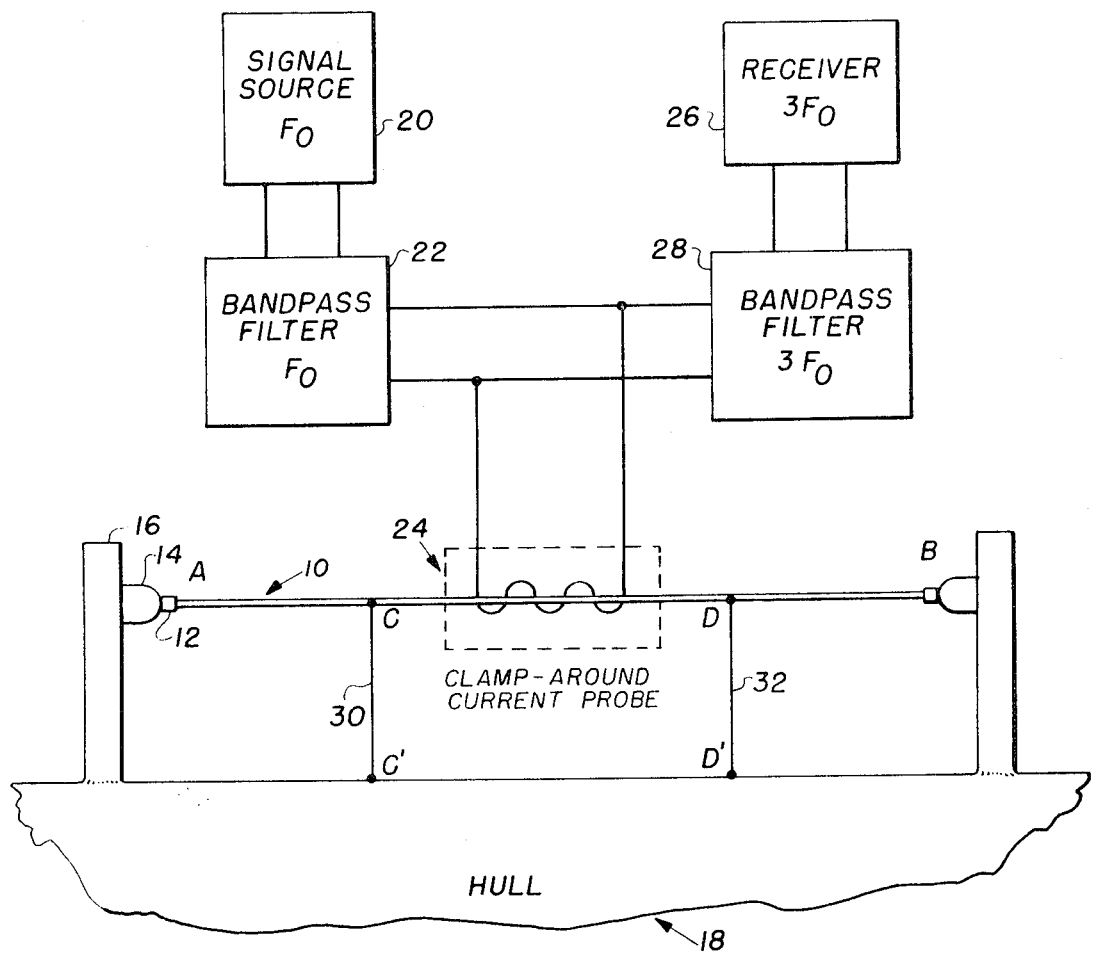

METHOD FOR LOCATING NONLINEAR MECHANICAL JUNCTIONS OF METALLIC ELECTRICAL CONDUCTORS

CROSS-REFERENCE TO RELATED APPLICATIONS

The subject matter disclosed herein is closely related to U.S. Pat. No. 3,609,553 by Marvin J. Fraser et al. assigned to the United States of America as represented by the Secretary of the Navy and to U.S. Pat. application Ser. No. 239,066 entitled "Apparatus for Detecting Natural Nonlinearities in Antennas," filed on 3-29-72, by R. F. Elsner et al. and assigned to the same assignee as above.

BACKGROUND OF THE INVENTION

As disclosed in the above-referenced patent application and patent, the United State Navy is very concerned with identifying, classifying and locating RF interference sources aboard naval ships due to the detrimental effects which RF interference can have on the normal operation of communication systems. One such source comprises nonlinear junctions of metallic conductors such as pipes, ladders, etc. found on most ships. Various prior art schemes have been used to approximate the general location of interference-producing nonlinearities. These schemes, however, cannot be used to locate the actual nonlinearity itself whereby corrective action can be taken. For example, spurious signals generated by a nonlinearity can be traced to a network of under-deck piping, but the nonlinearity itself can often not be pinpointed. As a result this source of radio frequency interference cannot be eliminated. In addition to pinpointing nonlinearities, the device to be disclosed herein can further be used by shipyard personnel to evaluate the electrical performance of bonding straps applied across known or suspected nonlinearities such as mechanically loose fittings and which are often interference generators themselves.

SUMMARY OF THE INVENTION

A technique for eliminating RF interference generators by identifying and locating nonlinear mechanical junctions of metallic, electrical conductors located in the general vicinity of communication systems. Suspected junctions are fed fundamental signals whereby they will generate third harmonic signals if they are nonlinear. Once it is determined that they are nonlinear, a bypass conductor is connected between the suspected exact location of each junction and ground and the amplitude of the third harmonic signals generated is compared to the amplitude generated in an unbypassed condition. A substantially zero or reduced amplitude in the bypassed condition indicates the direction in which the nonlinearity lies. The exact location is determined when the bypassing conductor is moved as close to the suspected nonlinearity as is physically practical while maintaining the reduced amplitude of the third harmonic signal.

STATEMENT OF THE OBJECTS OF THE INVENTION

It is the primary object of the present invention to describe a relatively simple technique and apparatus for locating precisely an RF interference-producing, nonlinear junction existing somewhere along a metallic conductor.

Other objects, advantages and novel features of the invention will become apparent from the following detailed description of the invention when considered in conjunction with the accompanying drawings.

BRIEF DESCRIPTION OF THE DRAWING

The drawing is a simplified block diagram of electrical apparatus embodying the inventive concept disclosed herein and shown in conjunction with a metallic lifeline of the type normally found on naval ships and which can comprise a source of RF interference if it has nonlinear mechanical junctions, i.e., metal-to-metal junctions.

DESCRIPTION OF THE PREFERRED EMBODIMENT

In the drawing, the apparatus embodying the present inventive concept is shown being used to locate nonlinear mechanical junctions which exist somewhere along the mechanical junctions which exist along the lifeline 10. The lifeline is of the conventional type found on naval ships and terminates in a turnbuckle assembly 12 which is hooked to a welded loop 14 on a metal stanchion 16 thereby providing a metal-to-metal contact or junction. The stanchions 16 are normally welded to the hull 18 of a naval ship (not shown).

The electrical apparatus basically comprises a signal source 20 operable at a selectable fundamental frequency $F_o$. The output of the signal source is filtered by the bandpass filter 22 which is centered at the frequency $F_o$. The filtered output is coupled to a conventional clamp-around current probe 24. The probe is shown clamped around the metal conductor 10.

The output of the probe 24 is fed to the receiver 26 which is centered to receive third-harmonic currents generated by the signal source 20 in nonlinear junctions of the lifeline 10. A bandpass receive filter 28 is centered at the third-harmonic and assures that only this signal is received at the receiver.

For simplicity a shipboard metallic lifeline 10 has been selected to illustrate and describe the operation of the apparatus. As stated earlier, each end of the metallic lifeline normally terminates in a turnbuckle assembly 12 which is hooked to a welded loop 14 on a metal stanchion 16. If one or both of these turnbuckle stanchion interfaces or junctions A and B are nonlinear, then interference could be generated by signals induced in the lifeline by strong emanations from transmitting antennas on the ship. These nonlinearity generated radio frequency signals could then be received by the ship's receiving system as undesired interference.

In operation, the directional nonlinearity locator provides a filtered signal at frequency $F_o$ to the clamp-around current probe 24. If either of the terminations A or B or both comprise nonlinear junctions, a third-harmonic signal will be generated and fed to the receiver 26 through the filter 28. Should both junctions be linear, no third-harmonic signal will be generated. Thus once it has been determined that either junction or both are nonlinear each junction can be tested individually to determine its exact location by simple bypassing technique as follows.

Assuming that the junction A is nonlinear and that the junction B is linear, then temporarily connecting points C and C′ with a metallic conductor 30 will reduce the fundamental current $F_o$ fed to the junction A and will also reduce the magnitude of any third-harmonic signal $3F_o$ generated by junction A. Conversely, if the conductor joining points C and C' is removed and reconnected across points D and D', then the strong fundamental $F_o$ will be fed to the nonlinear junction A and a strong third-harmonic signal $3F_o$ will be detected by the receiver.

In essence therefore, a zero or reduced third-harmonic amplitude is obtained when the nonlinear junction is bypassed. By noting or measuring the third-harmonic amplitudes, as each junction is bypassed in turn, the direction in which the nonlinear junction lies can thus be readily determined. As a further step, the current probe can be moved closer to the nonlinear junction in the direction indicated and the bypassing procedure repeated until the nonlinear junction is pinpointed precisely.

If both junctions are linear no third-harmonic current will be obtained at the receiver. If both are nonlinear, strong third-harmonic outputs will be obtained from both bypassing conditions. Individual nonlinear junctions can be evaluated by placing the current probe around each stanchion in turn, and then applying the bypassing conductor as above. Should either junction be linear, resistive, open, or shorted, the device can be made to perform its function by choosing $F_o$ so that a reasonable $F_o$ current is induced into the line even if the line were to be open-circuited at both ends (that is, even if the line approximated a dipole antenna).

It should be understood that although the drawing illustrates a lifeline as metallic conductor, the apparatus and technique can be advantageously utilized on other items such as ladders, pipes, cable armors, etc., where multiple nonlinear mechanical junctions may be present. Furthermore, it can be appreciated that the device is especially advantageous for the following reasons. First, it can test suspected items for nonlinearity in a simple, yet highly effective manner, and can be used to pinpoint the exact location of nonlinearities in complex environments such as communications systems aboard naval ships. After such nonlinearities have been eliminated, the technique can be used to verify this fact. Furthermore, suspected nonlinear items may be tested for nonlinearity without using the transmitting or receiving equipment of the communication system aboard the ship. Finally, the device obviously can be made very small and self-contained which is a very important consideration on naval ships where space is very limited.

Obviously many modifications and variations of the present invention are possible in the light of the above teachings. It is therefore to be understood that within the scope of the appended claims the invention may be practiced otherwise than as specifically described.

What is claimed is:

1. A technique for accurately locating nonlinear mechanical junctions of metallic conductors to eliminate RF interference comprising the steps of:
    applying a fundamental signal to a suspected junction by means of a current probe held in close proximity thereto;
    sensing any third-harmonic currents generated thereby if said suspected junction is nonlinear;
    bypassing a portion of said fundamental signal from said suspected junction by connecting a metallic bypass conductor between the general location of said junction and ground;
    sensing the magnitude of third-harmonic currents generated thereby;
    comparing said magnitude relative to the magnitude of said third-harmonic currents generated in an unbypassed condition;
    connecting said bypass conductor at various points of said suspected junction and in a direction relative to the first such connection indicated by decreasing third-harmonic magnitudes,
    whereby the exact location of said junction is determined when said bypass conductor is connected as close as possible to said nonlinear junction whereby a substantially constant reduced magnitude is obtained.

2. Apparatus for accurately locating nonlinear mechanical junctions of metallic conductors comprising:
    signal source means for providing a fundamental signal at a frequency $F_o$;
    first bandpass filter means centered at $F_o$ connected across the output of said signal source means;
    current probe means connected at the input thereof to the output of said first bandpass filter for applying said fundamental signal to suspected mechanical junctions of said metallic conductors;
    second bandpass filter means centered at the third-harmonic, $3F_o$ of said fundamental signals connected to the output of said current probe means;
    receiver means connected to the output of said second bandpass filter means for sensing third-harmonic currents generated by said suspected mechanical junctions; and,
    conductor means for bypassing portions of said fundamental signal from said suspected junctions whereby the exact location of nonlinear mechanical junctions is obtained when the magnitude of said third-harmonic currents is reduced or is substantially equal to zero when said bypassing conductor is positioned as close to the suspected nonlinear junction as is physically possible.

3. The apparatus of claim 2 wherein said current probe comprises a clamp-around device.

* * * * *